(12) United States Patent
Hughes

(10) Patent No.: US 7,296,167 B1
(45) Date of Patent: Nov. 13, 2007

(54) COMBINED SYSTEM RESPONSES IN A CHIP MULTIPROCESSOR

(75) Inventor: William A. Hughes, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 483 days.

(21) Appl. No.: 10/956,537

(22) Filed: Oct. 1, 2004

(51) Int. Cl.
*G06F 1/26* (2006.01)
*G06F 12/08* (2006.01)

(52) U.S. Cl. .................. 713/310; 711/141; 711/144; 713/320

(58) Field of Classification Search .............. None
See application file for complete search history.

(56) References Cited

U.S. PATENT DOCUMENTS

| | | | | |
|---|---|---|---|---|
| 6,092,155 A | * | 7/2000 | Olnowich | 711/142 |
| 6,631,401 B1 | | 10/2003 | Keller et al. | 709/213 |
| 6,665,788 B1 | | 12/2003 | Hughes | 711/206 |
| 6,748,479 B2 | | 6/2004 | Sano et al. | 710/316 |
| 7,003,633 B2 | * | 2/2006 | Glasco | 711/146 |
| 7,069,392 B2 | * | 6/2006 | Kota et al. | 711/141 |
| 7,174,467 B1 | * | 2/2007 | Helms et al. | 713/300 |
| 2003/0217233 A1 | | 11/2003 | Rowlands et al. | 711/141 |

* cited by examiner

*Primary Examiner*—Gary Portka
(74) *Attorney, Agent, or Firm*—Lawrence J. Merkel; Meyertons, Hood, Kivlin, Kowert & Goetzel, P.C.

(57) ABSTRACT

In one embodiment, a node comprises, integrated onto a single integrated circuit chip (in some embodiments), a plurality of processor cores and a node controller coupled to the plurality of processor cores. The node controller is coupled to receive an external request transmitted to the node, and is configured to transmit a corresponding request to at least a subset of the plurality of processor cores responsive to the external request. The node controller is configured to receive respective responses from each processor core of the subset. Each processor core transmits the respective response independently in response to servicing the corresponding request and is capable of transmitting the response on different clock cycles than other processor cores. The node controller is configured to transmit an external response to the external request responsive to receiving each of the respective responses.

15 Claims, 7 Drawing Sheets

COMBINED SYSTEM RESPONSES IN A CHIP MULTIPROCESSOR

BACKGROUND

1. Field of the Invention

This invention is related to the field of processors and, more particularly, to multiple processor cores (e.g. in chip multiprocessors) and responding to system requests from the multiple processor cores.

2. Description of the Related Art

Chip multiprocessors (CMPs) are becoming more popular in the present age. A CMP has two or more processor cores implemented on the same integrated circuit. CMPs may be a more efficient use of the millions of transistors that may be included on an integrated circuit than, for example, a more elaborate single processor.

Different CMPs may include different numbers of processor cores. For example, different models of a CMP product line may have different numbers of processor cores. Thus, a given "slot" for a CMP in a computer system may have differing numbers of processor cores dependent on which particular CMP is installed in that slot. In some cases, the number of processor cores affects the operation of the computer system. For example, when maintaining cache coherency in the system, probes are transmitted to determine if any caches are storing a cache block that is to be accessed by a given processor core. Typically, each of the other processor cores are probed, and provide a probe response. Thus, the total number of responses to the probe may be equal to the total number of processor cores. With different CMPs, the total number varies and thus the number of responses to expect varies. Similarly, system management messages may be transmitted to each of the processor cores. The number of responses indicating that the system management message has been serviced may vary depending on the number of processor cores in each CMP.

SUMMARY

In one embodiment, a node comprises, integrated onto a single integrated circuit chip, a plurality of processor cores and a node controller coupled to the plurality of processor cores. The node controller is coupled to receive an external request transmitted to the node, and is configured to transmit a corresponding request to at least a subset of the plurality of processor cores responsive to the external request. The node controller is configured to receive respective responses from each processor core of the subset. Each processor core transmits the respective response independently in response to servicing the corresponding request and is capable of transmitting the response on different clock cycles than other processor cores. The node controller is configured to transmit an external response to the external request responsive to receiving each of the respective responses.

In another embodiment, a node comprises a plurality of processor cores and a node controller coupled to the plurality of processor cores. The node controller is coupled to receive an external system management message transmitted to the node. The system management message is defined to request that a state be entered by each of the plurality of processor cores. The node controller is configured to transmit a corresponding request to at least a subset of the plurality of processor cores responsive to the external request, and to receive respective responses from each processor core of the subset. The node controller is configured to transmit an external response to the external system management message responsive to receiving each of the respective responses.

BRIEF DESCRIPTION OF THE DRAWINGS

The following detailed description makes reference to the accompanying drawings, which are now briefly described.

Figure 1:
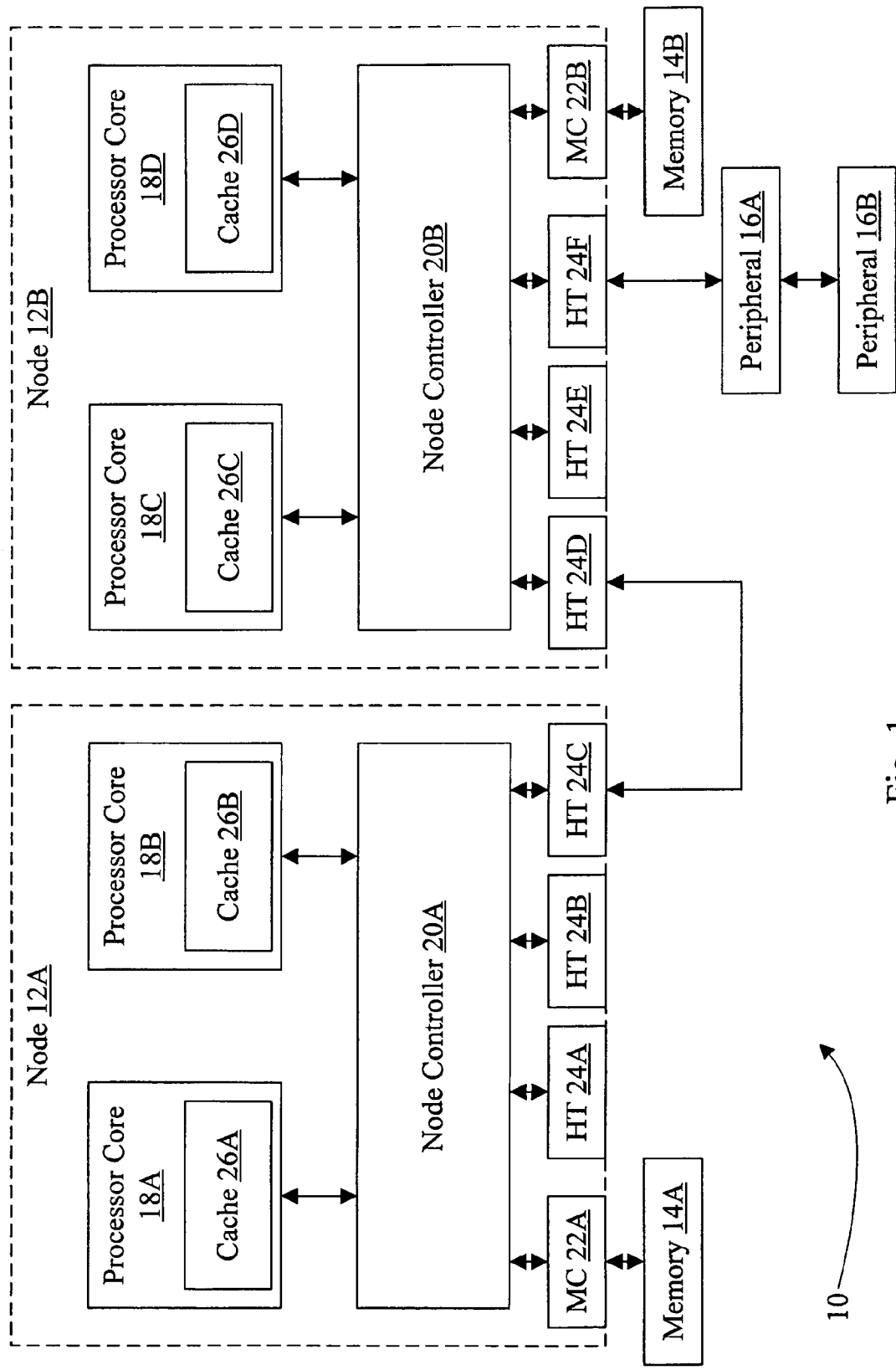
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a computer system 10 is shown. In the illustrated embodiment, the computer system 10 includes nodes 12A-12B, memories 14A-14B, and peripheral devices 16A-16B. The nodes 12A-12B are coupled, and the node 12B is coupled to the peripheral devices 16A-16B. Each of the nodes 12A-12B are coupled to respective memories 14A-14B. The node 12A comprises processor cores 18A-18B coupled to a node controller 20A which is further coupled to a memory controller 22A and a plurality of HyperTransport™ (HT) interface circuits 24A-24C. The node 12B similarly comprises processor cores 18C-18D coupled to a node controller 20B which is further coupled to a memory controller 22B and a plurality of HT interface circuits 24D-24F. The HT circuits 24C-24D are coupled (via an HT interface, in this embodiment) and the HT circuit 24F is coupled to the peripheral device 16A, which is coupled to the peripheral device 16B in a daisy-chain configuration (using HT interfaces, in this embodiment). The memory controllers 22A-22B are coupled to the respective memories 14A-14B. In the illustrated embodiment, each of the processor cores 18A-18D includes a respective cache or caches 26A-26D. In one embodiment, each of the nodes 12A-12B may be a single integrated circuit chip comprising the circuitry shown therein in FIG. 1. That is, each node 12A-12B may be a chip multiprocessor (CMP). Other embodiments may implement the nodes 12A-12B as two or more separate integrated circuits, as desired. Any level of integration or discrete components may be used.

The node controller 20A may generally be configured to receive communications from the processor cores 18A-18B, the memory controller 22A, and the HT circuits 24A-24C and to route those communications to the processor cores 18A-18B, the HT circuits 24A-24C, and the memory controller 22A dependent upon the communication type, the address in the communication, etc. In one embodiment, the node controller 20A includes a system request queue (SRQ) into which received communications are written by the node controller 20A. The node controller 20A may schedule communications from the SRQ for routing to the destination or destinations among the processor cores 18A-18B, the HT circuits 24A-24C, and the memory controller 22A. Communications may include requests, responses to requests, and other communications. The node controller 20B may be similar with regard to the processor cores 18C-18D, the HT circuits 24D-24F, and the memory controller 22B. Operation of the node 12A and its components will be discussed in more detail below. Operation of the node 12B and its components may be similar.

For certain types of external requests received into the node 12A, the node controller 20A may be configured to transmit corresponding requests to the processor cores 18A-18B and to receive responses from the processor cores 18A-18B. Once all the responses (from each processor core 18A-18B) are received, the node controller 20A may transmit an external response to the external request. Thus, in some embodiments, one external response may be generated for the node 12A. The number of processor cores 18A-18B within the node 12A may not affect the number of external responses generated.

In some embodiments, the responses from the processor cores 18A-18B may be received on different clock cycles, at least in some cases. That is, each processor core 18A-18B may receive the corresponding request, and may independently service the request internally. Responsive to servicing the request, each processor core 18A-18B may generate its response. The responses may occur on the same clock cycle, or on different clock cycles, depending on how quickly each processor core 18A-18B is able to service the request. In some embodiments, the node controller 20A may be configured to transmit the corresponding request to each processor core 18A-18B on different clock cycles (e.g. dependent on each processor core's having a free buffer to store the request).

As used herein, an external request (with respect to a node) is a request that is generated by a device/circuitry external to the node. For example, an external request received by the node 12A may be generated in the node 12B, or in a peripheral device 16A-16B and routed to the node 12A. An external response is a response transmitted by a node to a device/circuitry external to the node in response to a previous external request.

In one example, an external request may be a probe transmitted by a source to maintain coherency for a cache block. The probe may include an address identifying the affected cache block. Generally, a probe is a communication used in coherency schemes to determine if the receiver of the probe has a cache block identified by the probe and to specify a state change for the cache block, if found in the receiver. In some cases, the probe may also require that a modified cache block be returned to memory or the requester, if any. Other requests may be interpreted as probes in other embodiments. For example, write operations may be used in addition to or instead of probes. As another example, a read operation that indicates that the source of the read operation is going to modify the cache line may be an indication of update. Such read operations are often referred to as read with intent to modify operations, read modify operations, or read exclusive operations. Any coherency state may be used in the coherency scheme. For example, the modified, exclusive, shared, invalid (MESI) scheme, and the MOESI scheme (where the O state is the owned state) are common, as well as schemes including subsets of the MESI and/or MOESI states. A cache block stored in a given cache may have one of the states specified in the coherency scheme. The modified state indicates that the cache block is modified in the cache with respect to the copy of the cache block in memory. The exclusive state indicates that the cache block is stored in the cache, and that no other cached copies exist in the system. Thus, a cache block in the exclusive state may be modified without performing any coherency activity. The shared state indicates that the cache block is stored in the cache, but other caches may also have a copy of the cache block. The invalid state indicates that the cache block is not valid in the cache (e.g. it has been invalidated, or is not stored in the cache). The owned state indicates that the cache owns the block (e.g. is responsible for writing it back to memory), but other copies of the cache block may exist in other caches.

If the external request is a probe, the node controller 20A may transmit corresponding probes to the processor cores 18A-18B. The processor cores 18A-18B may check their respective caches 26A-26B for the cache block indicated by the probe, possibly make a state change, and return a response to the node controller 20A. Once the node controller 20A receives a response from each processor core 18A-18B, the node controller 20A may transmit an external probe response to the source of the external probe. The format of the probe transmitted by the node controller 20A to the processor cores 18A-18B may differ from the format of the external probe. For example, the external probe may be a probe packet as defined in the HT coherent interface specification, in this embodiment. The probes transmitted by the node controller 20A may be formatted according to the interface between the node controller 20A and the processor cores 18A-18B. Similarly, the internal probe responses from the processor cores 18A-18B to the node controller 20A may differ from the external probe response. For example, the external probe response may be a probe response or read response packet as defined in the HT coherent interface specification, in this embodiment.

The external probe response may be a composite response of the individual responses to the probe from the processor cores 18A-18B. The external probe response may indicate the highest state of ownership of the cache block in the node 12A, in terms of the implemented coherency scheme. The highest state may be the state indicating the most ownership of the cache block out of the states indicated by the processor cores 18A-18B. For example, in one embodiment, a probe response may indicate whether or not a hit is detected for the cache block (e.g. any coherency state except invalid) and whether or not the cache block is modified (e.g. the M state in the MESI scheme). Thus, if one processor core 18A-18B indicates invalid and the other processor core 18A-18B indicates hit modified, the composite response may be hit modified. If one or both processor cores 18A-18B indicate hit (but not modified) and no hit modified is detected, the composite response may be hit, not modified. If both processor cores 18A-18B indicate no hit, the composite response may be no hit.

Another example of an external request may be a system management message. Generally, a system management message may be a request that causes each processor core 18A-18B to enter a specific state. For example, the state may be a power management state (such as the StpGnt state or states used in x86 processors). The state may be the system management interrupt active (SMI active) state. Other embodiments may define other system management messages.

In response to an external system management message, the node controller 20A may transmit corresponding system management messages to the processor cores 18A-18B. The format of the system management messages transmitted to the processor cores 18A-18B may differ from the format of the external system management message. Each processor core 18A-18B may enter the state requested by the system management message, and may return a response indicating that the state has been entered. Once the node controller 20A receives a response from each processor core 18A-18B, the node controller 20A may transmit an external response to the system management message, indicating that the node 12A has entered the state.

It is noted that, while the above discussion refers to the node controller 20A transmitting the corresponding requests to each of the processor cores 18A-18B, in other embodiments the node controller 20A may be configured to transmit the corresponding requests to a subset of the processor cores 18A-18B, excluding at least one processor core, in at least some cases. For example, in some embodiments, the node controller 20A may be configured to cache information about cache blocks that are cached by the processor cores 18A-18B, and the node controller 20A may filter which processor cores are probed based on the information. The information may not be complete, but may be enough to rule out a processor core 18A-18B as storing a copy of the cache block in some cases. The embodiment in which the external request causes a transmission of corresponding requests to each processor core 18A-18B will be used as an example for the remainder of this description but other embodiments may implement transmission to a subset.

Generally, the processor cores 18A-18B may use the interface(s) to the node controller 20A to communicate with other components of the computer system 10 (e.g. peripheral devices 16A-16B, processor cores 18B-18D, the memory controllers 22A-22B, etc.). The interface may be designed in any desired fashion. Cache coherent communication may be defined for the interface, as mentioned above. In one embodiment, communication on the interfaces between the node controller 20A and the processor cores 18A-18B may be in the form of packets similar to those used on the HT interfaces. In other embodiments, any desired communication may be used (e.g. transactions on a bus interface, packets in a different form, etc.). In other embodiments, the processor cores 18A-18B may share an interface to the node controller 20A (e.g. a shared bus interface).

The memories 14A-14B may comprise any suitable memory devices. For example, a memory 14A-14B may comprise one or more RAMBUS DRAMs (RDRAMs), synchronous DRAMs (SDRAMs), double data rate (DDR) SDRAM, static RAM, etc. The address space of the computer system 10 may be divided among memories 14A-14B. Each node 12A-12B may include a memory map (e.g. in the node controller 20A) used to determine which addresses are mapped to which memories 14A-14B, and hence to which node 12A-12B a memory request for a particular address should be routed. The memory controllers 22A-22B may comprise control circuitry for interfacing to the memories 14A-14B. Additionally, the memory controllers 22A-22B may include request queues for queuing memory requests, etc.

The HT circuits 24A-24F may comprise a variety of buffers and control circuitry for receiving packets from an HT link and for transmitting packets upon an HT link. The HT interface comprises unidirectional links for transmitting packets. Each HT circuit 24A-24F may be coupled to two such links (one for transmitting and one for receiving). A given HT interface may be operated in a cache coherent fashion (e.g. between nodes 12A-12B) or in a non-coherent fashion (e.g. to/from peripheral devices 16A-16B). In the illustrated embodiment, the HT circuits 24C and 24D are coupled via coherent HT links for communicating between the nodes 12A-12B. The HT circuits 24A-24B and 24E are not in use, and the HT circuit 24F is coupled via non-coherent links to the peripheral devices 16A-16B.

The peripheral devices 16A-16B may be any type of peripheral devices. For example, the peripheral devices 16A-16B may include devices for communicating with another computer system to which the devices may be coupled (e.g. network interface cards, circuitry implementing network interface functionality that is integrated onto a computer system's main circuit board, or modems). Furthermore, the peripheral devices 16A-16B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "peripheral device" is intended to encompass input/output (I/O) devices.

Generally, a processor core 18A-18D may comprise circuitry that is designed to execute instructions defined in a given instruction set architecture. That is, the processor core circuitry may be configured to fetch, decode, execute, and store results of the instructions defined in the instruction set architecture. The processor cores 18A-18D may comprise any desired configurations, including superpipelined, superscalar, or combinations thereof. Other configurations may include scalar, pipelined, non-pipelined, etc. Various embodiments may employ out of order speculative execution or in order execution. The processor core may include microcoding for one or more instructions or other functions, in combination with any of the above constructions. Various embodiments may implement a variety of other design features such as caches, translation lookaside buffers (TLBs), etc. Additionally, in the illustrated embodiment, each processor core 18A-18D includes a corresponding cache or caches 26A-26D. The caches 26A-26D may be of any capacity and configuration (e.g. set associative, direct-mapped, fully associative, etc.). The caches 26A-26D may each represent hierarchical sets of caches, in some embodiments (e.g. a cache 26A-26D may represent L1 instruction and data caches with an underlying L2 cache).

It is noted that, while the present embodiment uses the HT interface for communication between nodes and between a node and peripheral devices, other embodiments may use any desired interface or interfaces for either communication. For example, other packet based interfaces may be used, bus interfaces may be used, various standard peripheral interfaces may be used (e.g. peripheral component interconnect (PCI), PCI express, etc.), etc.

It is noted that, while the computer system 10 illustrated in FIG. 1 comprises two nodes 12A-12B, other embodiments may implement one node or more than two nodes. Similarly, each node 12A-12B may include two or more processor cores, in various embodiments. Various embodiments of the computer system 10 may include different numbers of HT interfaces per node 12A-12B, differing numbers of peripheral devices coupled to one or more of the nodes, etc.

Figure 2:
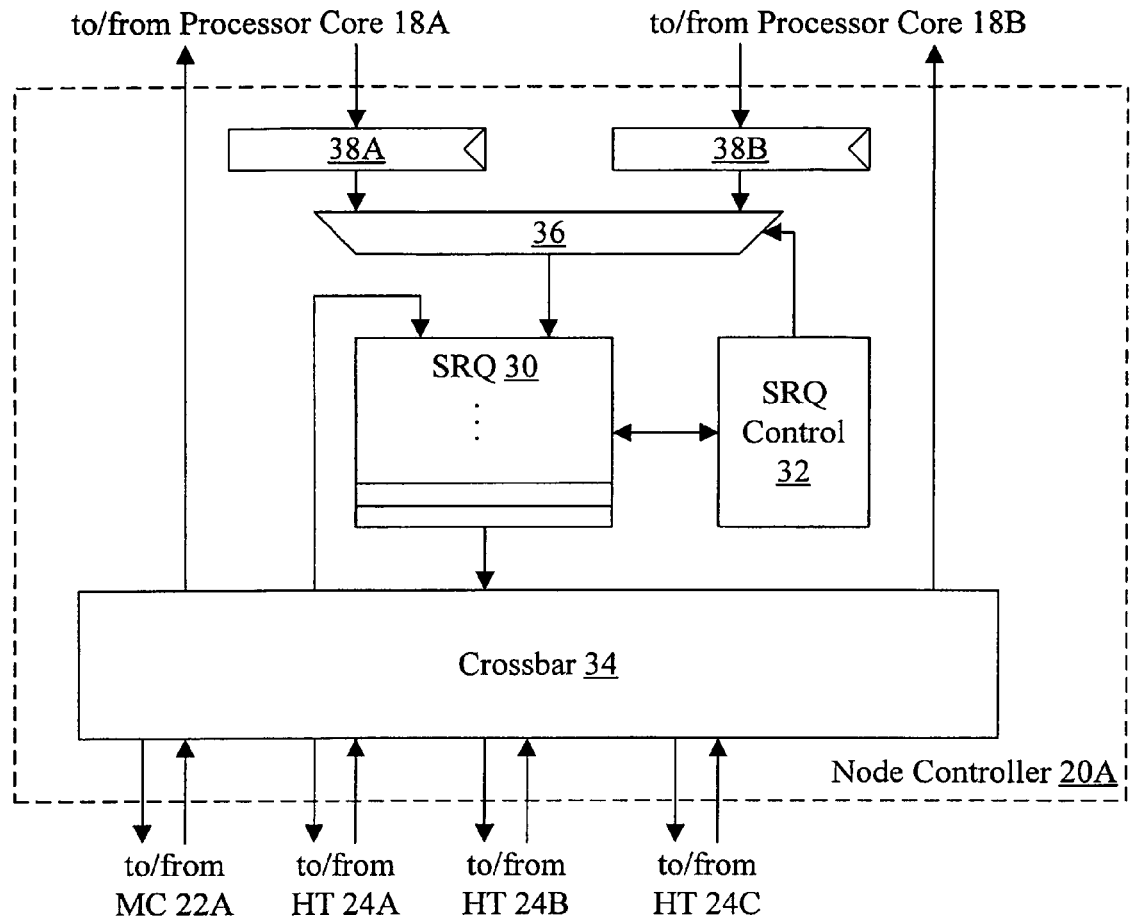
FIG. 2 is a block diagram of one embodiment of a node controller shown in FIG. 1.

Turning now to FIG. 2, a block diagram illustrating one embodiment of a node controller 20A is shown. In the illustrated embodiment, the node controller 20A includes a system request queue (SRQ) 30, an SRQ control unit 32, a crossbar 34, a multiplexor (mux) 36 and a set of input flops 38A-38B. The flops 38A-38B are coupled to receive communications from the processor cores 18A-18B, respectively, and are coupled to the mux 36. The mux 36 is coupled to receive selection controls from the SRQ control unit 32 and is coupled to the SRQ 30. The SRQ control unit 32 is coupled to the SRQ 30. The SRQ 30 is coupled to the crossbar 34, which is further coupled to receive and provide communications to the HT circuits 24A-24C and the memory controller 22A, and to provide communications to the processor cores 18A-18B.

The SRQ 30 is configured to store external communications (e.g. requests, responses, etc.) received by the node 12A (e.g. through the HT circuits 24A-24C) as well as internal communications generated by the memory controller 22A (e.g. probes for read/write requests transmitted to the memory controller 22A, read responses providing data for a read request, etc.) and the processor cores 18A-18B (e.g. requests, responses, etc.). Generally, the SRQ 30 comprises multiple entries, each entry configured to store a different communication. The SRQ control unit 32 may be configured to allocate entries for received communications, and may be configured to schedule communications for transmission through the crossbar 34. Additionally, the SRQ control unit 32 may be configured to updated state in the SRQ 30 for a given communication in response to completion of various internal activities. For example, if a probe is in the SRQ 30 and the corresponding responses from the processor cores 18A-18B are received for the probe, the SRQ control unit 32 may update the state in the entry storing the probe to record the receipt of the response and to record the coherency state reported in the response.

The crossbar 34 may comprise circuitry configured to route communications between the various sources and destinations. The sources may include the SRQ 30 (a request scheduled by the SRQ control unit 32), the HT circuits 24A-24C, and the memory controller 22A. The destinations may include the SRQ 30, the HT circuits 24A-24C, the memory controller 22A, and the processor cores 18A-18B. Generally, received communications are routed to the SRQ 30 for later scheduling by the SRQ control unit 32. Communications scheduled from the SRQ 30 and transmitted to the crossbar 34 may include information identifying the destination or destinations for the communication, which the crossbar 34 may use to route the communications.

More particularly, in one embodiment, if an external probe or system management message is received, the SRQ control unit 32 may schedule the corresponding probes/system management messages to be transmitted to the processor cores 18A-18B. The crossbar 34 may route the corresponding probes/system management messages to the processor cores 18A-18B. In other embodiments, a path to the processor cores 18A-18B that does not pass through the crossbar 34 may be implemented. In some embodiments, an internally generated probe (from the memory controller 22A) due to a request generated by one of the processor cores 18A-18B may use the same path that external probes use. In such an embodiment, the probe may not be routed to the processor core 18A-18B that sourced the request.

In the illustrated embodiment, the SRQ 30 may include a write port shared by the processor cores 18A-18B and a write port (or ports) used by the crossbar 34. The processor cores 18A-18B may be configured to transmit a communication (e.g. request or response) to the node controller at most once every other clock cycle (or at most once every N clock cycles, if N processor cores are included in a node). The communications may be captured in the flops 38A-38B and provided to the mux 36. The SRQ control unit 32 may control the mux 36 to write received communications from the flops 38A-38B into the SRQ 30 (or to update an existing entry of the SRQ 30, in the case of a response). If only one communication is received in a given clock cycle, the SRQ control unit 32 may select the corresponding flop 38A-38B through the mux 36. If two communications are received in a given clock cycle, the SRQ control unit 32 may select one flop 38A-38B in one clock cycle and, in the following clock cycle, select the other flop 38A-38B. With the maximum transmission of one communication every other clock cycle, there is time to handle both communications before a new communication may be received. In other embodiments, a direct path from the processor cores 18A-18B may be provided to the mux 36 in addition to the flops 38A-38B, if desired. In still other embodiments, a write port for each processor core 18A-18B may be provided on the SRQ 30 and the mux 36 may be eliminated.

The SRQ 30 may have any construction (e.g. registers, random access memory (RAM), etc.). In one embodiment, the SRQ 30 may comprise a shift queue storing various state information for each request, an address RAM storing an address provided in the communication, and a data RAM configured to store data associated with the communication (e.g. a cache block located by the address). Each shift queue entry may comprise a pointer to the address RAM and a pointer to the data RAM, locating the corresponding address and data for a communication (if any).

Figure 3:
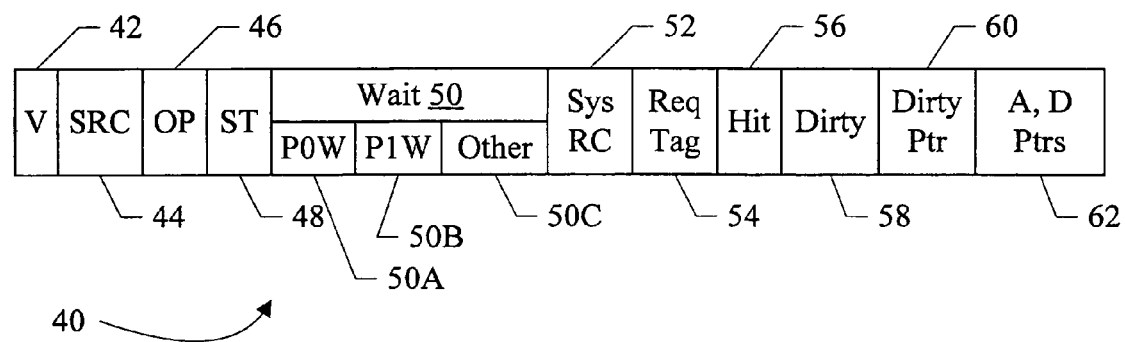
FIG. 3 is a block diagram of one embodiment of a system request queue entry.

FIG. 3 is a block diagram of one embodiment of an entry 40 that may be used in one embodiment of the SRQ 30. The illustrated entry 40 may be part of the shifting queue structure mentioned above. Other embodiments may implement any subset of the information illustrated in FIG. 3, any additional information, or any subset with additional information, as desired.

The entry 40 may include a valid (V) bit 42 indicating whether or not the entry is valid (that is, storing a communication). The entry 40 may further include a source field (SRC) 44 identifying a source of the communication within the node (e.g. one of the HT interfaces 24A-24C, the processor cores 18A-18B, or the memory controller 22A). The entry 40 may include a operation (OP) field 46 identifying the type of communication. For example, the OP field 46 may identify a request such as a read, write, probe, etc.; a response such as a read response, a probe response, various operation done responses, etc.; a system management message; an interrupt request or response; etc. A state (ST) field 48 may be included to track the state of the communication (e.g. through various phases of completion). The definition of the state field 48 may be dependent on the operation.

The entry 40 may further include a wait field 50. The wait field 50 may comprise various wait bits identifying conditions that may prevent the scheduling of the communication in the entry 40. For example, if a given wait bit is set, scheduling may be inhibited until the corresponding condition is detected. Other embodiments may indicate a wait condition when the bit is clear, or may use multibit values, as desired. In the illustrated embodiment, the wait field 50 may comprise a processor core 0 wait (P0W) bit 50A, a processor core 1 wait (P1W) bit 50B, and other wait bits 50C. The P0W bit 50A may indicate that the entry is waiting for a response from processor core 0 (e.g. processor core 18A). Similarly, the P1W bit 50B may indicate that the entry is waiting for a response from processor core 1 (e.g. processor core 18B). The P0W and P1W bits may be set in the entry storing an external probe in response to the scheduling of the corresponding probes for transmission to the processor cores 18A-18B. In response to receiving a response from each of the processor cores 18A-18B, the corresponding P0W and P1W bit may be cleared. Similarly, the P0W and P1W bits may be set in the entry storing an external system management message in response to the scheduling of the corresponding communications for transmission to the processor cores 18A-18B and may be cleared in response to receiving the responses from the processor cores 18A-18B. Other wait bits 50C may be defined for other wait conditions as desired (e.g. wait for a free buffer in the crossbar 34; wait for ordering reasons; etc.).

The entry 40 may include a system response count (Sys RC) 52 used for communications that are transmitted externally. For example, if a probe is generated by the memory controller 22A for a read or write request being serviced by the memory controller 22A, the system response count may be set to the number of responses expected from the system. The number of expected responses may be the number of nodes in the computer system 10 minus one (for the node 12A), since the nodes may implement the combining of probe responses from the processor cores in the node. Similarly, for a system management message generated with the node 12A, the system response count may be set to indicate the expected number of responses to the system management message (e.g. the number of nodes minus one). A request tag (Req Tag) field 54 may store a tag assigned by the requestor to the communication, if the communication is internally generated. The request tag may be returned to the requestor when the node controller 20A communicates with the requester (e.g. to indication completion, to supply data for a request such as a read, etc.).

The entry 40 may further include coherency state returned by the processor cores 18A-18B for a probe. In the illustrated embodiment, the coherency state may be represented by a hit bit 56, a dirty bit 58, and a dirty pointer field 60. The hit bit 56 may indicate, when set, that the cache block identified by the probe was a hit in the cache 26A-26B of one of the processor cores 18A-18B. The dirty bit 58 may indicate, when set, that the cache block is modified (dirty) in the cache 26A-26B of one of the processor cores 18A-18B. The dirty pointer field 60 may be a pointer identifying the processor core 18A-18B that has the modified cache block and may further identify the buffer within the processor core 18A-18B that is storing the cache block, so that the cache block may be read when the probe response is to be transmitted external to the node 12A. The coherency state may be a composite of the coherency state reported in the probe responses from each of the processor cores 18A-18B. For example, if a hit is reported in any of the processor cores 18A-18B, the hit bit 56 may be set. If a modified cache block is reported, the dirty bit 58 may be set regardless of which processor core 18A-18B responds that the cache block is modified (and, if responses are received on different clock cycles, regardless of whether the processor core 18A-18B that responds modified transmits its response before or after the other processor core 18A-18B). The composite may reflect the highest level of ownership within the node 12A (e.g. dirty is higher than clean). Other embodiments may represent the coherency state in any other fashion.

As mentioned previously, in one embodiment, an address RAM and a data RAM may be provided to store the address and data related to a communication. For example, for a probe request, the address may be the address of the cache block. The data may be the modified data from one of the processor cores 18A-18B, if a modified cache block is detected. The modified data may be read from the processor core 18A-18B subsequent to receiving the probe response indicating modified and prior to transmitting the external probe response. The pointers to the corresponding entries in the address RAM and data RAM may be stored in a field 62 in the entry 40.

Figure 4:
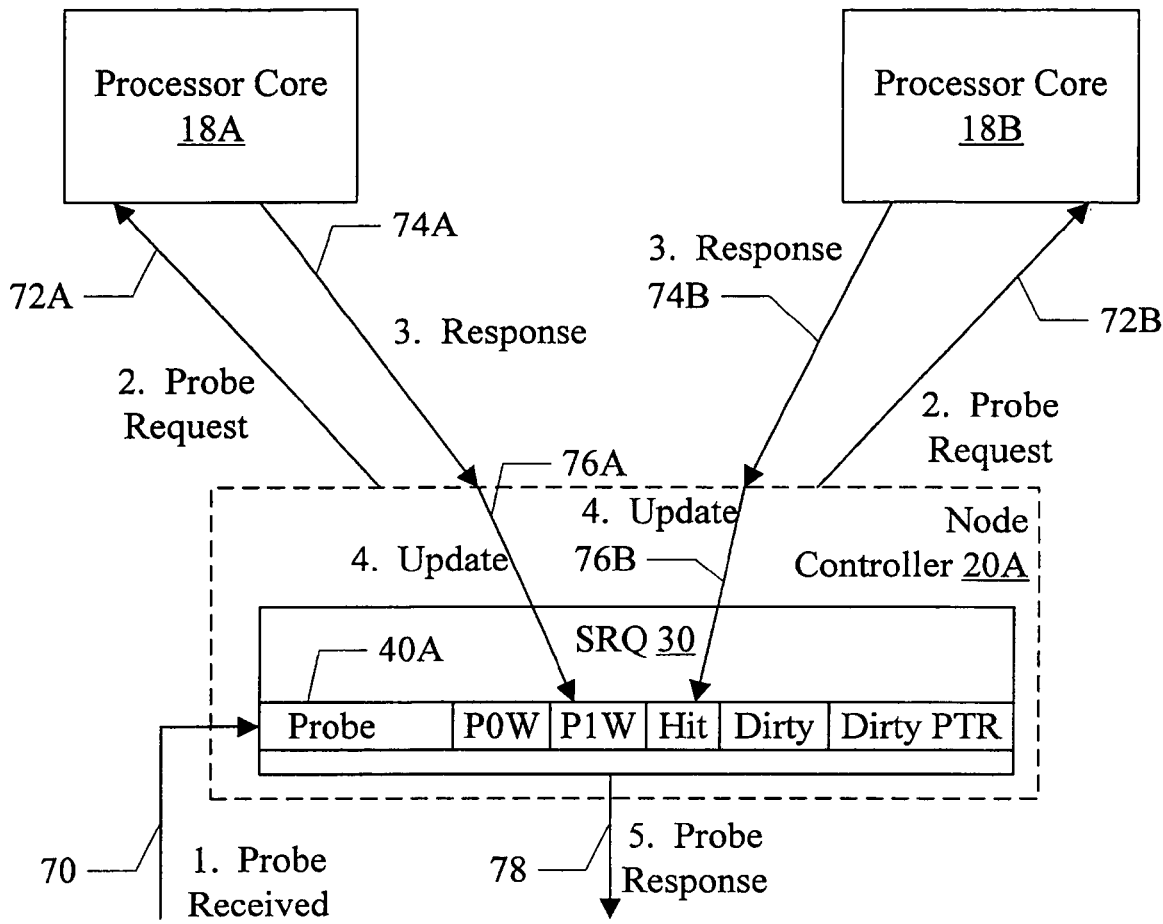
FIG. 4 is a high level block diagram illustrating one embodiment of handling an external probe.

Turning now to FIG. 4, a high level block diagram illustrating the handling of an external probe for one embodiment is shown. External communications and communications between the node controller 20A and the processor cores 18A-18B are shown.

The node controller 20A may receive an external probe from one of the HT circuits 24A-24C (arrow 70). The crossbar 34 may route the external probe to the SRQ 30, which may store the probe in an entry 40A. A portion of the entry 40A is shown in FIG. 4. Various embodiments may include the fields shown in FIG. 3.

The SRQ control unit 32 may select the entry 40A for scheduling, and the node controller 20A may transmit a probe request to each of the processor cores 18A-18B (arrows 72A-72B). Additionally, the SRQ control unit 32 may set the P0W and P1W bits to await the responses from the processor cores 18A-18B. The processor cores 18A-18B may each service the probe request and generate a probe response (arrows 74A-74B). In one embodiment, servicing the probe request may include checking the cache 26A-26B for the cache block identified by the probe request. If a copy of the cache block is located, the processor core 18A-18B may change the state of the cache block as indicated by the probe request as part of servicing the probe request. If the cache block is modified in the cache 26A-26B and the probe request indicates that the data is to be transferred in the probe response if modified, the processor core 18A-18B may evict the cache block from the cache (or provide a copy of the cache block from the cache) into a buffer for transmission to the node controller 20A as part of servicing the probe request. In such a case, the processor core 18A-18B may return an identifier of the buffer storing the modified cache block with the probe response to the node controller 20A. The node controller 20A may receive the responses, and may update the entry 40A to clear the corresponding wait bit P0W and P1W and record the coherency state indicated in the response (e.g. the hit bit, the dirty bit, and the dirty pointer) (arrows 76A-76B). In response to receiving the responses from each of the processor cores 18A-18B, the SRQ control unit 32 may generate the external probe response (arrow 78).

Figure 8:
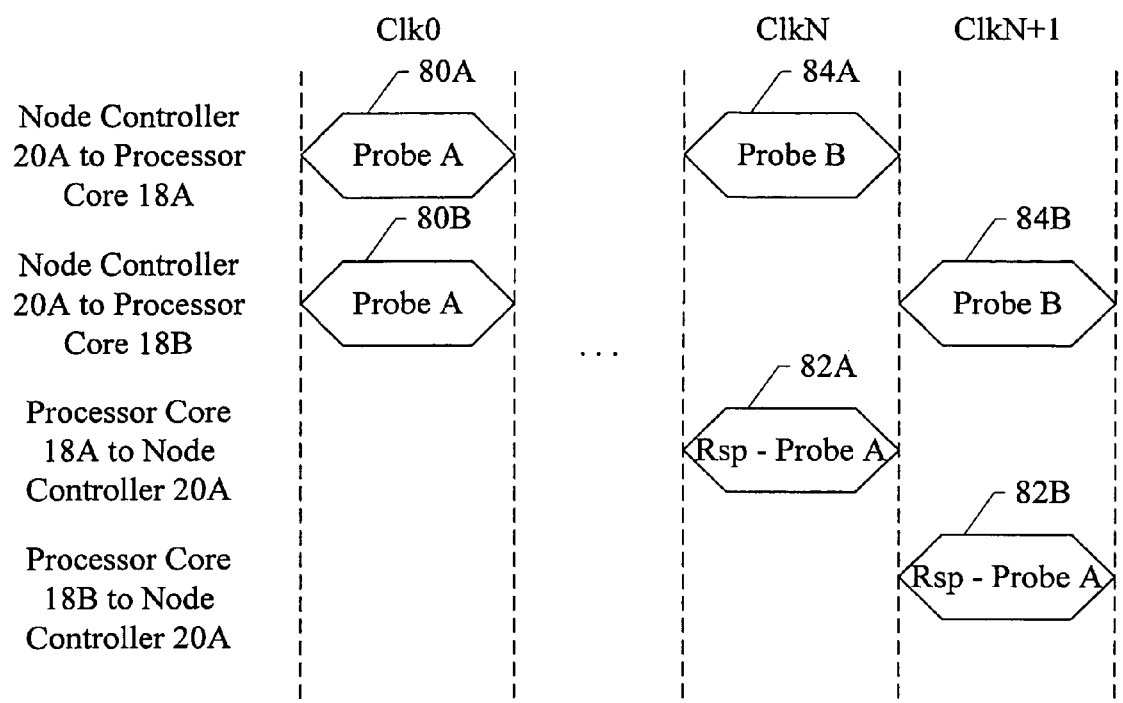
FIG. 8 is a timing diagram illustrating transmission of requests and responses for one embodiment.

It is noted that, while the probe requests (arrows 72A-72B), the responses (arrows 74A-74B), and the updates to the SRQ 30 entry 40A (arrows 76A-76B) are enumerated with the same numbers (2, 3, and 4 in FIG. 4), one or more of the corresponding requests, responses and updates may not occur at the same time for each of the processor cores 18A-18B, in some embodiments. For example, in some embodiments, the responses (arrows 74A-74B) may be provided independently from the processor cores 18A-18B when the processor cores 18A-18B complete servicing the probe requests. In some cases, at least, the processor cores 18A-18B may return responses on different clock cycles. For example, FIG. 8 illustrates an example in which the probe requests are transmitted to the processor cores 18A-18B on the same clock cycle (Clk0), shown as reference numerals 80A-80B in FIG. 8. The processor core 18A provides a response in clock cycle ClkN (reference numeral 82A), while the processor core 18B provides a response in clock cycle ClkN+1 (reference numeral 82B). In other cases, the responses may occur in the same clock cycle. For example, if the processor cores 18A-18B complete servicing the probe requests on the same clock cycle, the responses may be transmitted on the same clock cycle. As another example, the processor cores 18A-18B may transmit the responses on the same clock cycle due to other communications being transmitted to the node controller 20A by one or both of the processor cores 18A-18B, even if the processor cores 18A-18B complete servicing the probe request on different clock cycles. In yet other examples, one or more clock cycles may occur between the probe responses from the processor cores 18A-18B.

Similarly, in some embodiments, the SRQ control unit 32 may be configured to independently transmit probe requests to the processor cores 18A-18B. The probe requests may be transmitted on different clock cycles. For example, FIG. 8 illustrates probe requests for another cache block being transmitted to the processor core 18A in clock cycle ClkN and to the processor core 18B in clock cycle ClkN+1 (reference numerals 84A-84B). In other examples, the probe requests may be transmitted in the same clock cycle or one or more clock cycles may occur between transmission of the probe requests.

Figure 5:
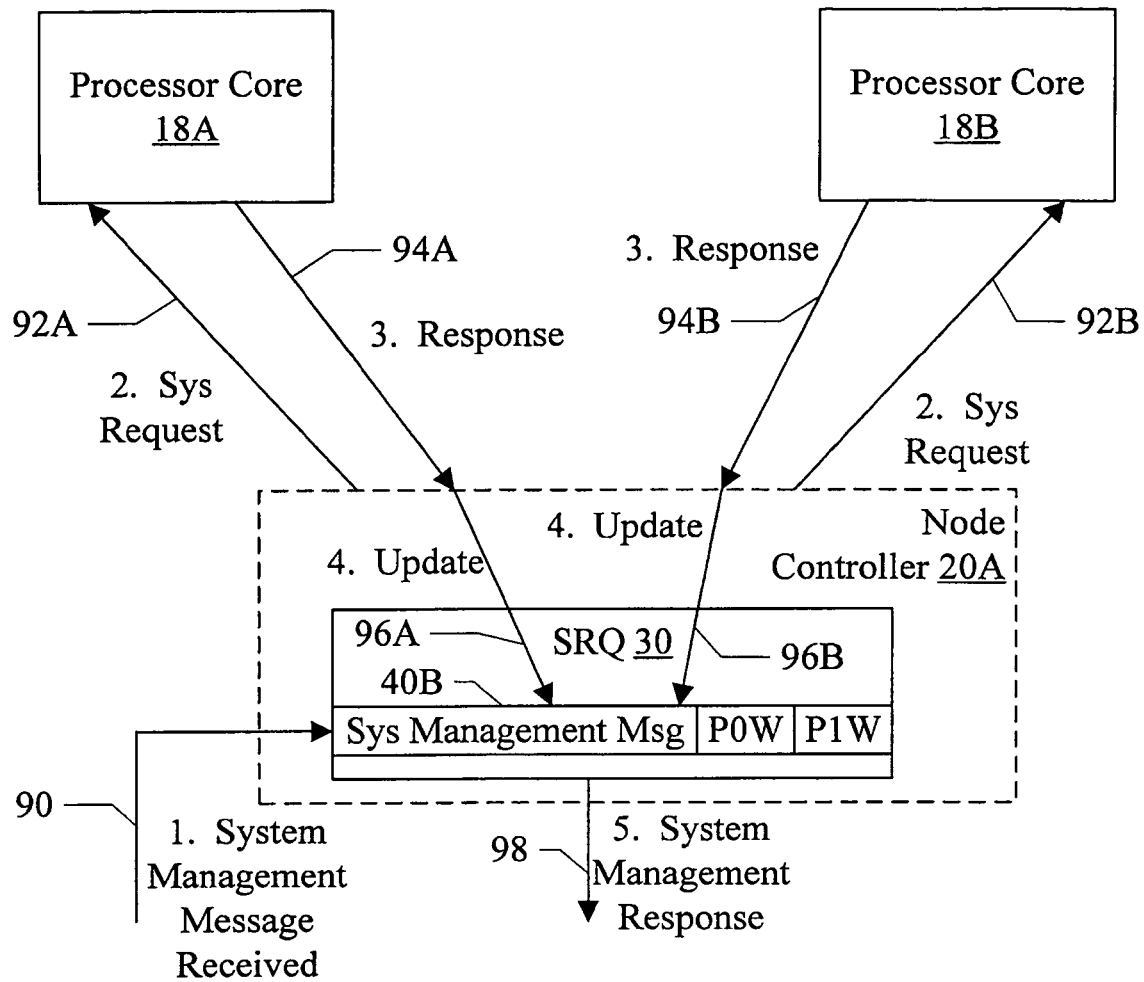
FIG. 5 is a high level block diagram illustrating one embodiment of handling an external system management request.

FIG. 5 is a high level block diagram illustrating the handling of an external system management message for one embodiment. External communications and communications between the node controller 20A and the processor cores 18A-18B are shown.

The node controller 20A may receive an external system management message from one of the HT circuits 24A-24C (arrow 90). The crossbar 34 may route the external probe to the SRQ 30, which may store the probe in an entry 40B. A portion of the entry 40B is shown in FIG. 4. Various embodiments may include the fields shown in FIG. 3.

The SRQ control unit 32 may select the entry 40B for scheduling, and the node controller 20A may transmit a system management request to each of the processor cores 18A-18B (arrows 92A-92B). Additionally, the SRQ control unit 32 may set the P0W and P1W bits to await the responses from the processor cores 18A-18B. The processor cores 18A-18B may each service the system management request and generate a response (arrows 94A-94B). In one embodiment, servicing the system management request may include entering the state requested by the system management message (e.g. a power management state such as a StpGnt state or an SMI active state indicating that the processor has entered SMI mode). Thus, the response from each processor core 18A-18B may be an acknowledgement that the state has been entered. The node controller 20A may receive the responses, and may update the entry 40B to clear the corresponding wait bit P0W and P1W (arrows 96A-96B). In response to receiving the responses from each of the processor cores 18A-18B, the SRQ control unit 32 may generate the external system management response (arrow 98).

It is noted that, while the system management requests (arrows 92A-92B), the responses (arrows 94A-94B), and the updates to the SRQ 30 entry 40B (arrows 96A-96B) are enumerated with the same numbers (2, 3, and 4 in FIG. 5), one or more of the corresponding requests, responses and updates may not occur at the same time for each of the processor cores 18A-18B, in some embodiments. Similar to FIG. 8, the responses may be provided in different clock cycles even if the system management requests are transmitted to the processor cores 18A-18B in the same clock cycle. For example, transitioning to SMI mode or entering a StpGnt state may generally involve the processor core 18A-18B reaching a state consistent with a boundary between instructions being executed in that processor core 18A-18B. Since the processor cores 18A-18B execute relatively independent of each other and may be executing different instruction streams, the number of clock cycles that elapse before the instruction-boundary state is established may differ. Similarly, in some embodiments, the system management requests may be transmitted by the node controller 20A to the processor cores 18A-18B in different clock cycles.

Figure 6:
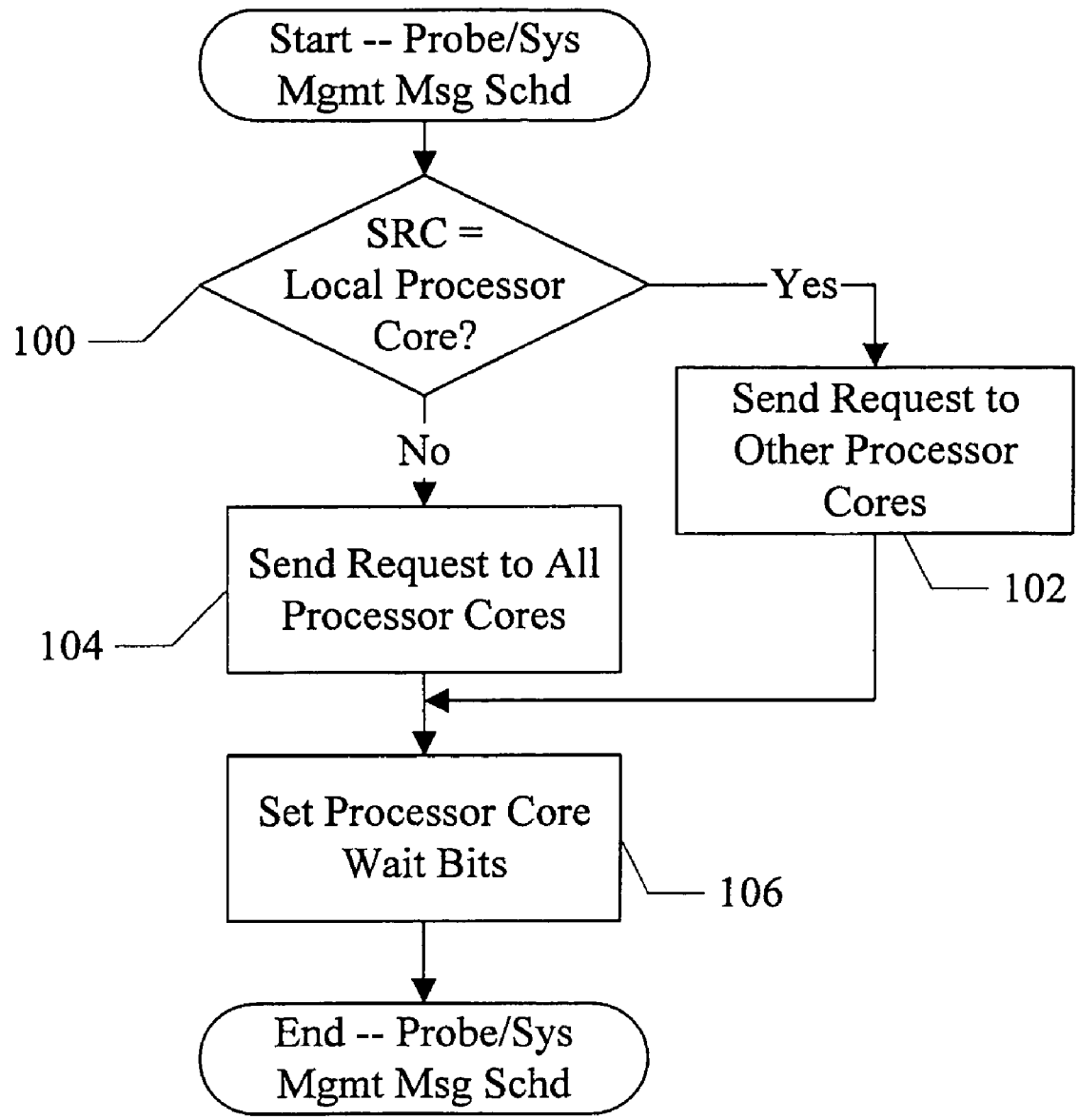
FIG. 6 is a flowchart illustrating operation of one embodiment of a node controller in response to scheduling a request.

Turning now to FIG. 6, a flowchart is shown illustrating operation of one embodiment of the node controller 20A (and more particularly the SRQ control unit 32) in response to scheduling a probe or system management message from the SRQ 30. Prior to being scheduled, the request may be received and written into the SRQ 30. While the blocks shown in FIG. 6 are illustrated in a particular order for ease of understanding, any order may be used. Furthermore, blocks may be performed in parallel by combinatorial logic circuitry in the node controller 20A/SRQ control unit 32. In other embodiments, a block or blocks may be pipelined over multiple clock cycles or the flowchart as a whole may be pipelined.

If the source of the probe or system management message is one of the local processor cores 18A-18B (decision block 100, "yes" leg), the SRQ control unit 32 may schedule the request to be transmitted to the other processor cores within the node 12A (block 102). That is, the request may be transmitted to each processor core 18A-18B except for the source processor core 18A-18B. Otherwise (that is, the request is an external request), the SRQ control unit 32 may schedule the request to be transmitted to all processor cores 18A-18B in the node 12A (block 104). The SRQ control unit 32 may set the wait bits (e.g. P0W and P1W in FIG. 3) corresponding to each processor core to which the request is transmitted (block 106). As mentioned previously, in some embodiments, the SRQ control unit 32 may independently schedule the request for transmission to various processor cores. In such embodiments, the operation of FIG. 6 may be repeated in later scheduling cycles until the request has been transmitted to each processor core (except the source processor core, if applicable).

Figure 7:
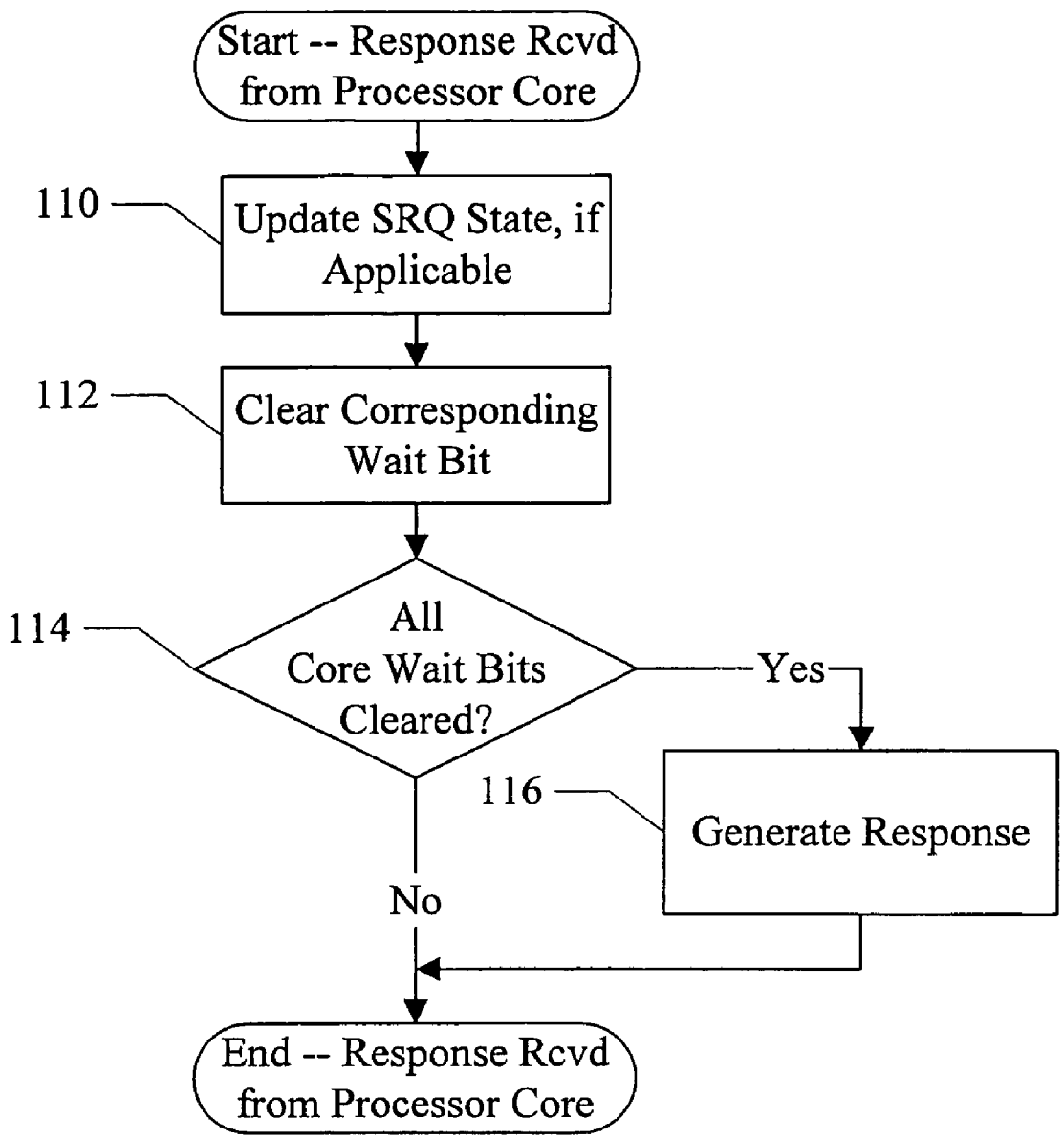
FIG. 7 is a flowchart illustrating operation of one embodiment of a node controller in response to receiving responses from processor cores.

FIG. 7 is a flowchart illustrating operation of one embodiment of the node controller 20A (and more particularly the SRQ control unit 32) in response to receiving a response from a processor core 18A-18B. While the blocks shown in FIG. 7 are illustrated in a particular order for ease of understanding, any order may be used. Furthermore, blocks may be performed in parallel by combinatorial logic circuitry in the node controller 20A/SRQ control unit 32. In other embodiments, a block or blocks may be pipelined over multiple clock cycles or the flowchart as a whole may be pipelined.

The SRQ control unit 32 may update the SRQ state for the entry that stores the request corresponding to the received response, if applicable (block 110). For example, for probe requests, the SRQ state may include a composite of the reported coherency state. The stored state may be updated to reflect the state reported in the response. Additionally, the SRQ control unit 32 may clear the wait bit corresponding to the processor core 32 that transmitted the response (block 112). If all the wait bits corresponding to processor cores have been cleared (decision block 114, "yes" leg), the SRQ control unit 32 may generate the external response corresponding to the request (block 116). The external response may actually be transmitted at a later time (e.g. after being scheduled by the SRQ control unit 32). Generating the response may, e.g., comprise updating the state in the SRQ entry to indicate that the response is ready to be transmitted. Generating the response may also include, for probe requests, retrieving the modified data from one of the processor cores 18A-18B if the response indicates modified data (e.g. the dirty bit is set).

More particularly, in one embodiment in which HT interfaces are used to communicate between nodes, the response to a probe may be either a probe response packet indicating the state and not including data if no modified data is stored in the node or a read response packet including the modified data if modified data is stored in the node.

Numerous variations and modifications will become apparent to those skilled in the art once the above disclosure is fully appreciated. It is intended that the following claims be interpreted to embrace all such variations and modifications.

What is claimed is:

1. A node comprising, integrated onto a single integrated circuit chip:
   a plurality of processor cores; and
   a node controller coupled to the plurality of processor cores, wherein the node controller is coupled to receive an external request transmitted to the node, and wherein the node controller is configured to transmit a corresponding request to at least a subset of the plurality of processor cores responsive to the external request, and wherein the node controller is configured to receive respective responses from each processor core of the subset, each processor core transmitting the respective response independently in response to servicing the corresponding request and capable of transmitting the response on different clock cycles than other processor cores, and wherein the node controller is configured to transmit an external response to the external request responsive to receiving each of the respective responses, and wherein the external request is a system management message requesting that a power management state be entered by each of the plurality of processor cores.

2. The node as recited in claim 1 wherein the at least a subset of the plurality of processor cores comprises each of the plurality of processor cores.

3. The node as recited in claim 1 wherein the external response is a composite of the respective responses.

4. The node as recited in claim 1 wherein the node controller is configured to receive an external probe identifying a cache block.

5. The node as recited in claim 4 wherein each of the plurality of processor cores comprises at least one cache, and wherein the node controller is configured to transmit a request for the processor core to probe the cache for the cache block in response to the external probe.

6. The node as recited in claim 5 wherein a probe response from each processor core indicates a state of the cache block in the processor core, and wherein each processor core is configured to transmit the probe response to the node controller.

7. The node as recited in claim 6 wherein the node controller is configured to record the state provided in each probe response.

8. The node as recited in claim 7 wherein the node controller is configured to generate an external probe response for the external probe, wherein the external probe response comprises the highest reported state.

9. The node as recited in claim 1 wherein the responses from the processor cores indicate that the power management state has been entered.

10. The node as recited in claim 9 wherein the external response indicates that the power management state has been entered by each of the plurality of processor cores.

11. The node as recited in claim 1 wherein the node controller comprises a system request queue configured to store the external request, and wherein the node controller is configured to record receipt of respective responses in the system request queue.

12. A method comprising:
    receiving an external request in a node comprising a plurality of processor cores;
    transmitting a corresponding request to at least a subset of the plurality of processor cores responsive to the external request;
    each processor core transmitting a respective response independently in response to servicing the corresponding request and capable of transmitting the response on different clock cycles than other processor cores;
    receiving the respective responses from each processor core of the subset;
    transmitting an external response to the external request responsive to receiving each of the respective responses, wherein the external request is a system management message requesting that a power management state be entered by each of the plurality of processor cores;
    receiving an external probe in the node;
    transmitting a corresponding probe request to at least a subset of the plurality of processor cores responsive to the external probe;
    each processor core transmitting a respective probe response independently in response to servicing the corresponding probe request and capable of transmitting the response on different clock cycles than other processor cores;
    receiving the respective probe responses from each processor core of the subset; and
    transmitting an external probe response to the external probe responsive to receiving each of the respective probe responses.

13. The method as recited in claim 12 wherein each of the plurality of processor cores comprises at least one cache, and wherein the corresponding probe request is a request for the processor core to probe the cache for the cache block.

14. The method as recited in claim 13 wherein the respective probe response from each processor core indicates a state of the cache block in the processor core, the method further comprising recording the state provided in each respective probe response.

15. The method as recited in claim 12 wherein the responses from the processor cores indicate that the power management state has been entered, and wherein the external response indicates that the power management state has been entered by each of the plurality of processor cores.

* * * * *